United States Patent [19]
Van Den Bergh

[11] Patent Number: 5,303,675
[45] Date of Patent: Apr. 19, 1994

[54] DISPOSABLE LITTER BOX HAVING LID WITH SEPARABLE UTENSIL

[76] Inventor: F. Andrew Van Den Bergh, 17509 Rockefeller Cir., Ft. Myers, Fla. 33912

[21] Appl. No.: 44,747
[22] Filed: Apr. 12, 1993
[51] Int. Cl.⁵ .............................................. A01K 29/00
[52] U.S. Cl. .................................. 119/165; 119/168; 229/125.03
[58] Field of Search ................ 119/165, 168; 229/125.03, 103

[56] References Cited

U.S. PATENT DOCUMENTS

| 1,625,335 | 4/1927 | Schneider | 229/125.03 |
| 1,657,325 | 1/1928 | Suttle | 229/125.03 |
| 4,271,787 | 6/1981 | Wellman et al. | 119/168 |
| 4,517,920 | 5/1985 | Yamamoto | 119/165 X |
| 4,541,360 | 9/1985 | Higgins et al. | 119/168 |
| 4,627,381 | 12/1986 | Reed et al. | 119/165 |
| 4,627,382 | 12/1986 | Muzzey | 119/165 |
| 5,054,828 | 10/1991 | Hantover | 229/103 |
| 5,172,652 | 12/1992 | Dobrin et al. | 119/165 |

FOREIGN PATENT DOCUMENTS

| 334252 | 9/1989 | European Pat. Off. | 119/168 |
| 2236664 | 4/1991 | United Kingdom | 119/168 |

Primary Examiner—John G. Weiss
Assistant Examiner—Todd E. Manahan
Attorney, Agent, or Firm—William E. Noonan

[57] ABSTRACT

A disposable litter box product for pets is provided. The product includes a box having spaced apart, generally flat top and bottom wall sections and a side wall section that interconnects the top and bottom wall sections. A quantity of pet litter is disposed in the box. At least one of the top and side wall sections includes a predetermined edge region that defines an opening into the box. A lid portion is separably joined to the edge region such that the opening is provisionally blocked and the box is closed. At least a part of the lid portion is selectively separable from the edge region to expose the opening and provide access into the box.

6 Claims, 2 Drawing Sheets

DISPOSABLE LITTER BOX HAVING LID WITH SEPARABLE UTENSIL

FIELD OF THE INVENTION

This invention relates to a disposable litter box that is effective for use with cats and other domesticated pets.

BACKGROUND OF THE INVENTION

Conventional cat litter boxes exhibit a number of disadvantages. Typically, the litter box comprises a permanent enclosure that is bought and maintained by the pet owner. Periodically, the owner must clean and replace the cat litter. This is usually a messy, tedious and distasteful task. Additionally, regular changing of the cat litter requires the owner to maintain a supply of replacement litter, which can be expensive and inconvenient to store. Because this task is fairly annoying, many pet owners neglect regular litter box changes. However, this can result in very unpleasant odors and unsanitary conditions in the vicinity of the litter box.

SUMMARY OF INVENTION

It is therefore an object of the present invention to provide a disposable litter box for cats and other domestic pets.

It is a further object of this invention to provide a litter box that totally eliminates the mess, tedium and annoyance commonly associated with changing the litter in a pet's litter box.

It is a further object of this invention to provide a pet litter box that reduces the foul odors and unsanitary conditions commonly associated with conventional litter boxes.

It is a further object of this invention to provide a litter box product that is convenient for transport and travel.

It is a further object of this invention to provide a disposable litter box that is lightweight and compact, yet rugged and durable.

This invention results from a realization that the task of changing the litter in a pet's litter box may be eliminated by employing a disposable litter box that is prepackaged and sold with a predetermined quantity of litter. The product is simply disposed of together with the cat litter whenever a litter change is required. This beneficial result is specifically achieved by the subject invention, which features a disposable litter box product for a pet. The product includes spaced apart, generally flat top and bottom wall sections and a side wall section interconnecting the top and bottom wall sections. There is a quantity of pet litter disposed in the box. At least one of the top and side wall sections of the box includes a predetermined edge region that defines an opening into the box. Attachment means separably join the lid portion to the edge region such that the opening is provisionally blocked and the box is closed. The attachment means further allow at least a part of the lid portion to be separated from the edge region to expose the opening and provide access into the box.

In a preferred embodiment, each of the top and bottom sections includes a narrowest transverse dimension and the side section includes a height that is less than the narrowest transverse dimension. The attachment means may include a perforated pattern formed in at least one of the top and side sections between the edge region and the lid section. Preferably, the lid section is fully included within the top section and the top section includes a peripheral border that extends generally inwardly from the side section and surrounds the edge region and lid section.

The lid section may include a main body segment and a utensil segment that is integral with and selectively separable from the main body. The utensil segment may comprise a spatula or a scoop that is adapted for cleaning waste from the pet litter. The box may further include means, spaced apart from the lid section and being selectively separable from said top section for selectively forming an auxiliary slot in the top section, which slot is adapted for receiving and holding the utensil. The means for selectively forming may include a perforated closure formed in the top section.

DISCLOSURE OF PREFERRED EMBODIMENTS

Other objects, features and advantages will occur from the following description of preferred embodiments and the accompanying drawings, in which.

Figure 1:
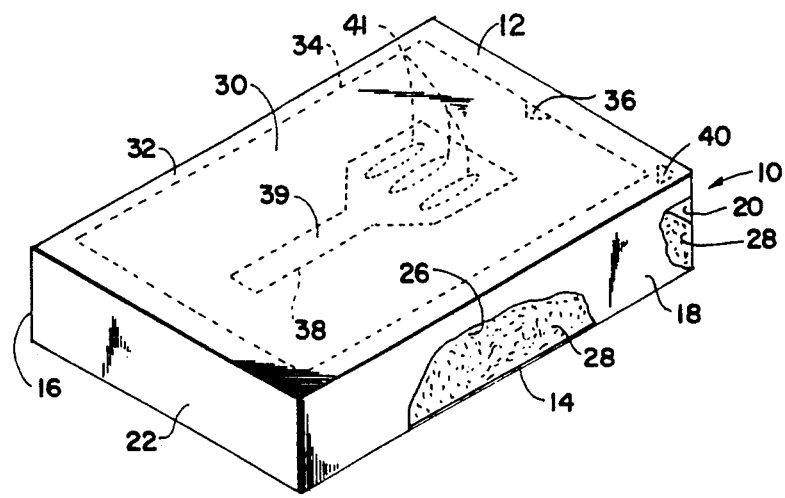
FIG. 1 is a perspective, partly cut-away view of a disposable litter box product according to this invention.

A disposable litter box product according to this invention is constructed using a rugged, yet lightweight and typically disposable material such as cardboard. Alternatively, various lightweight plastics may be used. The box preferably has a rectilinear shape including spaced apart top and bottom walls and four rectangular side walls interconnecting the bottom and top. However, in alternative embodiments, various other non-rectilinear shapes and sizes may be utilized.

Each of the wall surfaces of the box is typically flat. The top and bottom walls have generally the same size and are parallel to one another. When a rectilinear box is employed, the top and bottom wall sections have a length and a width. The width comprises the narrowest transverse dimension of the box. The side wall sections have a height that is less than the width or narrowest transverse dimension. As a result, when the box is opened for use, the interior of the box is exposed and easily accessible to the cat or other pet, and at the same time, the side walls are low enough to permit the pet to climb into and out of the litter box.

Initially the box is fully enclosed and contains a predetermined quantity of conventional pet litter. The top wall and possibly one or more of the side walls are provided with a structure that permits an opening to be formed quickly and conveniently into the box. More particularly, at least one of the top and side wall sections includes a predetermined edge region that defines the opening into the box. A lid is separably joined to the edge region such that the opening is temporarily blocked and the box is closed while being transported, sold and stored. Subsequently, when use of the box is desired, the lid portion is separated from the predetermined edge region to expose the opening and provide access into the box both for the pet and the pet owner who wishes to clean the box.

A preferred structure for separably joining the lid to the edge region is a perforated pattern that is formed in the box. In one embodiment, a rectangular perforated pattern is formed fully within the top section of the box. Each side of the perforated pattern is generally parallel to one of the sides of the top section. A perforated or otherwise preformed notch may be carried by the lid portion so that the pet owner can readily grasp the lid portion and pull it open.

Alternatively, the edge region may extend at least partially into one or more of the side walls. In still other embodiments, the edge may be formed peripherally about the side wall section only such that the lid portion includes the entire top portion, as well as parts of the side section. The lid portion may also be constructed so that it is permanently attached along at least one edge to either the top section or the wall section. In such embodiments the lid portion comprises a flap, which is partially separated from the box and hingedly folded over to expose the interior of the box and the pet litter contained therein. Other means for separably joining the lid portion to the box may include various types of adhesives and other known templates and punch-out constructions.

A significant advantageous feature of this invention is the provision of a designer scoop or spatula that is separably joined to a main body of the lid portion. Typically the scoop is attached by perforations or other known means of attachment. The scoop or spatula is used to clean the interior of the box. The top portion of the box preferably includes a perforated holder region in which is readily formed a hole or opening for receiving the utensil when the utensil is not in use.

The product of this invention provides a number of significant benefits to the pet owner. Annoying and messy refilling of the litter box is eliminated because the litter is contained in the box in which it is purchased. The box itself should be composed of a recyclable material such as cardboard or various plastics. Preferably, a waterproof construction is utilized. For example, the inner surfaces of the box may be lined with a wax or various wax byproducts. Plastics and other synthetics that are water resistent also may be used.

The self-contained litter box is convenient to display in stores and serves as its own carrying case so that is easily transported and stored at home. Various known types of cat litter may be used and various decorative designs and advertising logos may be applied to the outer surfaces of the box.

Quite significantly, the product of this invention is quick and convenient to clean. The built in scoop is employed to remove waste as required. When the odor becomes too strong, the box is simply discarded and replaced with a new box. The inwardly extending edges, in the preferred embodiment shown herein, contain cat litter within the box and prevent it from being scattered outside of the box. It is expected that the box will be effective for at least one week of use by a typical pet.

There is shown in FIG. 1 a cat litter box 10 that is constructed of cardboard, heavy duty paper, plastic or other rugged yet lightweight materials. Box 10 includes a generally flat top wall section 12, a flat bottom wall section 14 and a wall section 16 comprising four flat side segments 18, 20, 22 and 24 (FIG. 2) that interconnect upper and lower wall sections 12 and 14. The side walls are perpendicularly interconnected to one another and to the upper and lower wall sections such that box 10 features a rectilinear shape.

Figure 2:
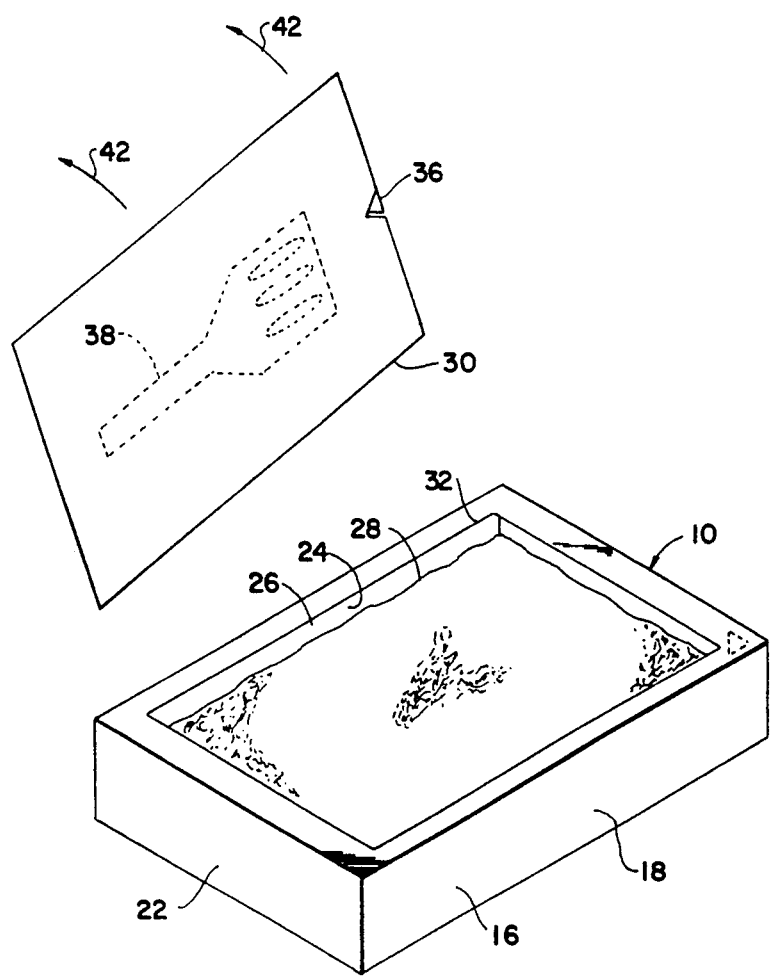
FIG. 2 is a different perspective view of the product with the lid removed to expose the interior of the box and the cat litter contained therein.

Box 10 includes an interior compartment 26, FIGS. 1 and 2, that contains a premeasured quantity of pet litter 28. This material partially fills compartment 26 and is normally introduced at the same time the box is manufactured. This will preferably occur at a manufacturing facility.

Top section 12 of box 10 includes a lid portion 30 that is surrounded by a rectangular edge region 32. The edge region can have various widths or virtually no width at all. Edge region 32 and lid portion 30 are integrally interconnected by separable attachment means comprising a rectangular perforated pattern 34 that extends about top section 12. When the box is initially constructed, top section 12 comprises a continuous unitary panel. A cutting tool or other known means are then utilized to form perforated pattern 34 in top section 12. This defines the edge region 32 and the removable lid portion 30. At the same time a perforated V-shaped notch area 36 is formed at one end of lid portion 30. Notch 36 assists in removing the lid portion, as is explained more fully below.

A perforated pattern 38 is formed in lid portion 30. Pattern 38 defines a scoop or spatula 39 that may be used to clean the litter box as described below. A plurality of perforated slot patterns 41 are formed within the body of scoop 39. A triangular perforated pattern 40 is formed in one corner of the top section 12 outside of lid portion 30. Perforated pattern 40 is punched open to form a holder in the manner described more fully below.

Box 10 is constructed, packaged, shipped and sold in the closed form shown in FIG. 1. Subsequently, the box is opened for use by the pet owner in the manner shown in FIG. 2. First, the pet owner presses against perforated notch pattern 36 to form a finger hole in the lid portion 30. The pet owner then pulls lid portion 30 upwardly in the direction of arrows 42. The lid portion tears away from edge region 32 and forms a predetermined opening into compartment 26 of box 10. As a result, the interior of the box and the prepackaged cat litter 28 are exposed. The box is then used by a cat or other pet in a conventional manner. The pet enters into the box through the predetermined opening. The height of each wall segment of side section 16 is less than the length or width of the opening into the box so that the pet's access to and from the box is facilitated. After lid portion 30 is removed, top section 12 comprises only the generally rectangular edge region 36. This region forms a lip that holds the cat litter inside the box and helps to keep the surrounding area neat and clean.

Figure 3:
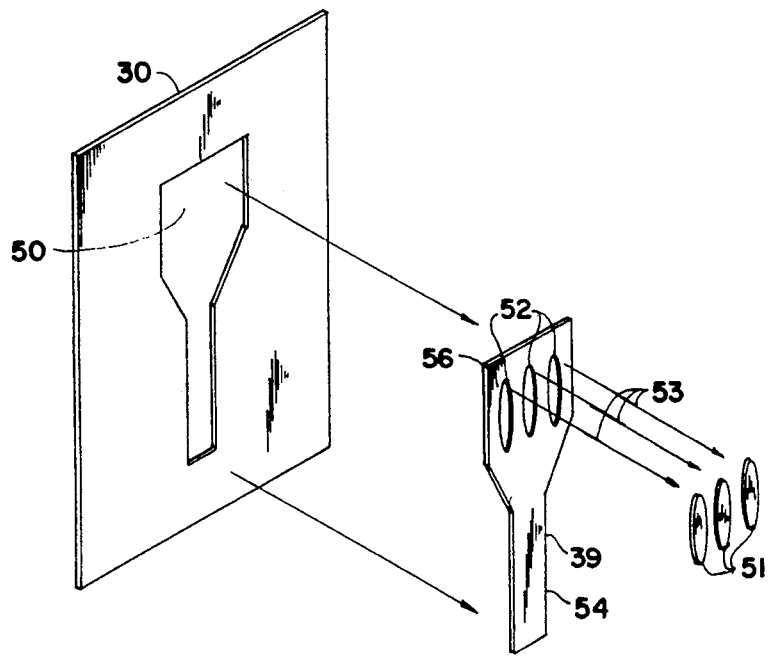
FIG. 3 is a perspective view of the lid and the integral spatula that is removed from the lid for use in cleaning the box.

After lid 30 is removed from box 10, scoop 39 is separated from cover 30 in the manner shown in FIG. 3. Specifically, the user applies pressure to perforated pattern 38 (shown in FIGS. 1 and 2) and, as a result, scoop 39 separates from lid portion 30. Left behind is a hole 50 in lid 30 that conforms in shape to the scoop 39. A plurality of inserts 51 that are defined by perforated slot patterns 41, FIG. 1, are then punched out or otherwise removed in the direction of arrows 53 to form slots 52. As a result, a fully formed scoop with a handle 54 and a broad scoop portion 56 is formed. When cardboard is employed the broad portion 56 may be folded or curved to form a scoop-like contour.

Figure 4:
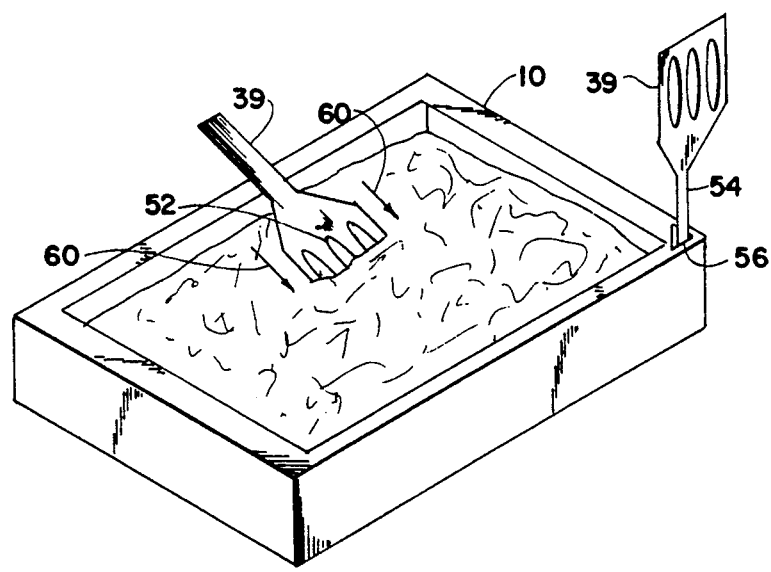
FIG. 4 is a perspective view, similar to FIG. 2, of the box in an open condition and the spatula alternatively in use to clean the litter box and stored in a holder formed in the top of the box.

FIG. 4 illustrates how scoop 39 may be employed with box 10. In particular, the scoop is used to clean waste from box 10 by introducing the scoop into the litter in the direction of arrows 60. Waste is picked up by scoop 39 and litter is permitted to fall back into the box through slots 52. Between uses, the scoop is stored by inserting handle 54 into a triangular holder slot 56. Slot 56 is formed by punching out or otherwise removing the triangular piece defined by perforated pattern 40 in top section 12, FIG. 1.

After a week or some other variable period of time, box 10 and scoop 39 are thrown away and replaced by a new product. As a result, messy and unpleasant refilling of a cat litter box are eliminated.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A disposable liter box product for a pet, said product comprising:
   a box that includes spaced apart, generally flat top and bottom wall sections and a side wall section interconnecting said top and bottom wall sections; and
   a quantity of pet liter disposed in said box;
   at least one of said top and side wall sections of said box including a predetermined edge region that defines an opening into said box, a lid portion, and attachment means for separably joining said lid portion to said edge region such that said opening is provisionally blocked and said box is closed; said attachment means including a perforated pattern formed in at least one of said top and side sections between said edge region and said lid portion and allowing at least a part of said lid portion to be separated from said edge region to expose said opening and provide access into said box; said lid portion including a main body segment and a utensil segment that is integral with and selectively separable from said main body segment; said top wall section including means, spaced apart from said lid portion, for selectively forming an auxiliary slot in said top section, which slot is adapted for receiving and holding said utensil segment.

2. The product of claim 1 in which each of said top and bottom sections includes a narrowest transverse dimension and said side section includes a height that is less than said narrowest transverse dimension.

3. The product of claim 1 in which said lid portion is fully included within said top section.

4. The product of claim 1 in which said utensil segment includes a scoop adapted for cleaning waste from said pet litter.

5. The product of claim 1 in which said means for selectively forming include a perforated closure formed in said top section.

6. The product of claim 1 in which said top section includes a peripheral border that extends inwardly from said side section and surrounds said edge region and said lid portion.

* * * * *